United States Patent [19]

Altenburger

[11] 3,708,627

[45] Jan. 2, 1973

[54] PLUG-IN LINE CIRCUIT ARRANGEMENT

[75] Inventor: Otto Altenburger, Rochester, N.Y. 14610

[73] Assignee: Stromberg-Carlson Corporation, Rochester, N.Y.

[22] Filed: June 15, 1971

[21] Appl. No.: 153,233

[52] U.S. Cl. ................................................179/18 F

[51] Int. Cl. ................................................H04m 3/22

[58] Field of Search ..........................179/18 F, 18 FF

[56] References Cited

UNITED STATES PATENTS 3,337,692 8/1967 Bruglemans ........................179/18 F

*Primary Examiner*—Thomas W. Brown
*Attorney*—Charles C. Krawczyk

[57] ABSTRACT

A plurality of telephone line circuits comprising a single group are mounted on a printed circuit board. The line circuits include common terminals and individual terminals for connecting individual telephone lines to a telephone switching network and for connecting the line circuits to a line scanner-marker circuit for identifying originating and terminating calls, first within a particular group (corresponding to a single circuit board) and second, the specific line circuit within the group associated with the call. The marking process for establishing a circuit path through the switching network is made on an individual line circuit basis, each telephone call being processed sequentially wherein the mark contacts for all line circuits on a given circuit board are actuated simultaneously by a common mark relay associated with the board.

6 Claims, 2 Drawing Figures

OTTO ALTENBURGER
INVENTOR

BY Charles C. Krawczyk

ATTORNEY

OTTO ALTENBURGER
INVENTOR.

BY Charles C. Krawczyk

ATTORNEY

PLUG-IN LINE CIRCUIT ARRANGEMENT

BACKGROUND OF THE INVENTION

This invention pertains to telephone line circuits in general, and more particularly, to line circuits mounted on a printed circuit board.

The rapid expansion experienced in the telephone industry has produced a prominent need for telephone systems having sufficient capacity to meet initial load requirements, yet designed with flexibility for economical expansion to meet continuing greater service demands brought about by growth in telephone usage.

A key element in any telephone system is the line circuit. A line circuit is provided for each individual telephone line. The line circuit is used in conjunction with a line scanner-marker circuit for detecting when a subscriber has gone off hook, thereby requesting service and is also used for making idle/busy checks in terminating calls before the terminating call is completed.

Since each telephone line requires an individual line circuit, the line circuit is one of the most prevalent components of a telephone system. Also, any expansion in the telephone industry ordinarily involves additional telephone lines, and consequently, additional line circuits. The need for flexibility in telephone systems for meeting expansion is therefore particularly relevant to line circuits because of their common usage.

Presently, line circuits are generally wired into the telephone system at the central office. This means that any time the system is expanded to accommodate more telephone lines, costly rewiring of the line circuits must also be made. It would be highly advantageous if the inconvenience and high cost of this rewiring could be avoided and an arrangement could be provided wherein more line circuits could be added by merely installing the appropriate number of additional plug-in type boards.

It is therefore an object of the invention to provide a new and improved line circuit arrangement for mounting on a plug-in type board so that the number of line circuits in a telephone system can be expanded simply by inserting additional line circuit boards.

It is a further object of the invention to provide a new and improved line circuit arrangement for use with a line scanner-marker circuit for detecting the presence of service requests and for making idle/busy checks relating to telephone calls in a plurality of telephone lines.

BRIEF DESCRIPTION OF THE INVENTION

A plurality of telephone line circuits are mounted on a plug-in type board which includes terminals for connecting individual telephone lines to a telephone switching network and for connecting the line circuits to a line scanner-marker circuit. Each line circuit has a line relay for detecting off hook conditions and for initiating a request for service condition. The line circuits are arranged on the board in a manner so that the line scanner-marker circuit can identify the particular board having a line circuit requesting service and then identify the particular line circuit. The identified line circuit is marked on an individual line circuit basis, each telephone call being processed sequentially wherein the mark contacts for all line circuits on the selected circuit board are actuated simultaneously by a common mark relay associated with the board. Each line circuit also has a cut-off relay which completes the tip and ring connections between the telephone line and switching network and prevents calls from being put through to telephones whose lines are already busy.

DESCRIPTION OF THE PREFERRED EMBODIMENT

Figure 1:
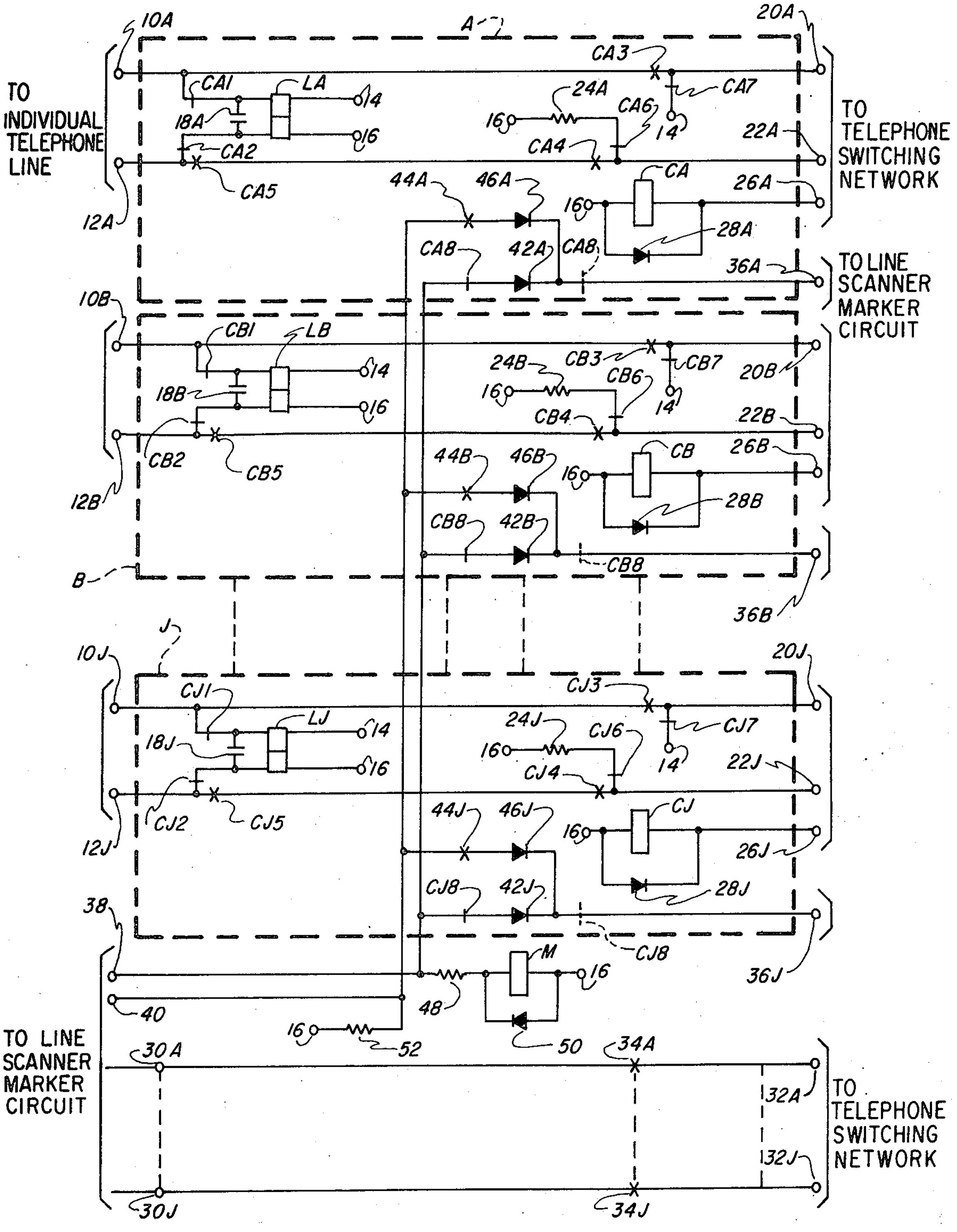
FIG. 1 is a schematic diagram of the line circuit arrangement of the invention depicting in detail three of the plurality of line circuits.

The line circuit arrangement of the invention, wherein a plurality of telephone line circuits are mounted on a plug-in type board, is designed to be used in a telephone system in conjunction with a copending patent application, Ser. No. 101,091, entitled "Line Scanner and Marker," filed on Dec. 23, 1970, for Otto Altenburger and Gunter F. Neumeier and assigned to the assignee of the present patent application. The line circuit arrangement as shown in FIG. 1 includes 10 line circuits A-J. Each line circuit includes a pair of tip and ring terminals for connection to an individual telephone line, and four terminals, tip, ring, sleeve and mark for connection to a telephone switching network. The mark terminals of the line circuits are shown grouped together rather than as a part of the respective line circuits for convenience of illustration. In addition, each line circuit has a separate terminal for connection to a line scanner-marker circuit (not shown) and are also connected in common to a pair of common terminals for connection to the line scanner-marker circuit.

Since all line circuits A-J are exactly the same, the line circuit arrangement will be described by referring to line circuit A. Although the invention is depicted in the preferred embodiment with 10 line circuits, the invention can be adapted to accommodate any number of line circuits on a board within size limitations. It should be noted that any number of these line circuit boards can be used in a telephone system to provide the necessary line circuit capacity.

A first pair of tip and ring terminals 10A and 12A of the line circuit A are adapted for connection to an individual telephone line. A line relay LA is connected to the terminals 10A and 12A through the normally closed contacts CA1 and CA2 of a cut-off relay CA. The line relay LA is a dual coil relay with one coil connected between the terminal 10A and a terminal 14 which is adapted for connection to one of the terminals of a direct current (DC) power source, such as the negative terminal. The other coil of the relay LA is connected between the terminal 12A and a terminal 16 which is adapted for connection to the other terminal of the DC power source, such as the positive terminal. The power terminals 14 and 16, which are provided for connecting different parts of the line circuits to a common DC source, are shown separated in FIG. 1 at the various connection points only for the sake of clarity. A capacitor 18A is connected across the relay LA between the contacts CA1 and CA2 to reduce the response time of the relay so as to avoid spurious operations caused by random signals.

A second pair of tip and ring terminals 20A and 22A are for connecting the line circuit A to the telephone switching network. The terminal 20A is connected to the terminal 10A through the normally open contacts CA3 of the relay CA, and the terminal 22A is connected to the terminal 12A through the normally open series connected contacts CA4 and CA5 of the relay CA. A resistor 24A in series with the normally closed contacts CA6 of the relay CA connects terminal 22A to the power terminal 16. The normally closed contacts CA7 connect the terminal 20A to the power terminal 14.

The coil of the cut-off relay CA is connected between the power terminal 16 and a sleeve terminal 26A which is adapted for connection to the telephone switching network. A diode 28A is connected across relay CA to provide a shunt path to eliminate any voltage spikes that may build up across the relay coil when the relay is released.

The line circuit A has a mark terminal 30A for connection to the line scanner-marker circuit and another mark terminal 32A for connection to the telephone switching network. The terminals 30A and 32A are connected through the normally open contacts 34A of a mark relay M which has separate normally open contacts in all the mark lines of all line circuits.

A terminal 36A of line circuit A is provided for connection to the line scanner-marker circuit. A pair of terminals 38 and 40, common to all the line circuits, is also provided for connection to the line scanner-marker circuit. The normally closed contacts CA8 of the relay CA in series with a diode 42A interconnects the terminals 36A and 38. The closed contacts CA8 may alternatively be placed between the common junction of the leads from the common terminals 38 and 40 and the terminal 36A without affecting the circuit operation. The normally open contacts 44A of the relay LA in series with a diode 46A interconnects the terminals 36A and 40. The diodes 42A and 46A are designed to prevent signals from the line scanner-marker circuit feeding back between terminals 38 and 40. The mark relay coil M is connected between terminal 38 and the power terminal 16 through a current limiting resistor 48. A diode 50 is connected across relay coil M to provide a shunt path for eliminating any voltage spikes that may build up across the coil when the relay is released. A resistor 52 is connected between the terminal 40 and the power terminal 16 for normally reverse biasing the diodes 46A–46J.

When the telephone receiver connected to line circuit A goes off hook so as to originate a call, a direct current path is connected across the terminals 10A and 12A completing the circuit for actuating the line relay LA, which, in turn, closes the contacts 44A. A scanning ground signal from the line scanner-marker circuit is then applied at the terminal 40 which is transmitted to the terminal 36A via the closed contacts 44A to indicate a request for service. In response to the service request, the line scanner-marker circuit applies a ground signal at the terminal 38 which actuates the mark relay M, thereby closing the contacts 34A–34J interconnecting all the mark terminals in all the line circuits on the selected board. A resistance battery is applied by the line scanner-marker circuit to the mark terminal 32A via the mark terminal 30A and the closed contacts 34A to provide a mark signal to the switching network for path finding purposes. Although this resistance battery is also applied to all the other line circuits A on all the other connected line circuit boards, these other line circuits will not provide a path for the mark signal since their respective normally open contacts corresponding to contacts 34A–34J will close only when the respective mark relay M on their respective circuit boards is actuated. A system for locating free paths through a telephone network is disclosed in a copending patent application, Ser. No. 153,221, entitled "Path Finding System," filed on June 15, 1971, for Otto Altenburger and Robert Bansemir assigned to the assignee of the present patent application.

When a free path to a register has been detected, a ground signal is applied in the register to the other end of the free path so that current flows in the mark circuit from the resistance battery to pick up the crosspoint devices in the network and complete the free path. The DC potential applied to the tip and ring terminals 20A and 22A through the contacts CA7 and CA6, respectively, permits the register to make a continuity check through the tip and ring contacts of the selected free path. If the tip and ring continuity check indicates a complete connection, a ground signal is applied to the sleeve terminal 26A from the register via the switching network which holds all operated crosspoint devices in the network and also operates the cut-off relay CA. The relay CA opens contacts CA1 and CA2 releasing relay LA which opens the contacts 44A. The contacts CA8 are opened simultaneously therewith so that a busy indication is provided. The relay CA also opens the contacts CA6 and CA7 removing the DC potential used for making a tip-ring continuity check and closes the contacts CA3, CA4 and CA5 completing the tip and ring connections from the calling telephone to the switching network. A dial tone is then transmitted to the telephone receiver requesting service so that dialing may begin and relay M is released since the marking process has been completed.

To describe a terminating call operation in the line circuit arrangement, it will be assumed that the called telephone is connected to the line circuit A in FIG. 1. The line scanner-marker circuit has already identified this particular line circuit and the line circuit board on which the line circuit is located. The line scanner then makes an idle/busy check for this circuit by applying a ground signal at terminal 38 which is transmitted to all of the 36A–36J terminals connected to idle line circuits via the CA8–CJ8 contacts which are closed. Any line circuit which is already busy (indicating that the connected telephone is in use) will have its contacts open (CA8–CJ8) preventing the ground signal from passing through to the 36A–36J terminals. The absence of a ground signal at a 36A–36J terminal is detected by the line scanner-marker circuit which indicates a busy condition and the terminating call for the line circuit is not completed.

Assuming the line circuit A is idle, contacts CA8 are closed and the ground signal from terminal 38 is transmitted to terminal 36A and detected by the line scanner-marker circuit (which knows the appropriate line circuit terminal 36A–36J to monitor). The line scanner-marker then proceeds to terminate the call.

The above ground signal on terminal 38 also actuates the mark relay M which closes the contacts 34A–34J interconnecting all the mark circuits (terminals 30A–30J and 32A–32J) in all the line circuits. A resistance battery is applied by the line scanner-marker circuit to the mark terminal 32A via the mark terminal 30A and the closed contacts 34A to provide a mark signal to the switching network for path finding purposes for connection to the junctor circuit seized by the calling party. When a free path to a junctor has been detected, a ground signal is applied to the mark lead in the junctor at the other end of the free path so that current flows from the resistance battery to pick up the crosspoint devices in the network and complete the free path. The DC potential applied to the tip and ring terminals 20A and 22A through the contacts CA7 and CA6, respectively, permits the junctor control to make a continuity check through the tip and ring contacts of the selected free path. If the tip and ring continuity check indicates that a connection is complete, a ground signal is applied to the sleeve terminal 26A from the junctor via the switching network which holds all operated crosspoint devices in the network and also operates the cut-off relay CA. Relay CA actuates its contacts in the same manner as previously described under an originating call, marking the selected line busy, completing the line circuit tip and ring connections and permitting the called subscriber to be rung. The mark relay M is released since the marking process has been completed.

Figure 2:
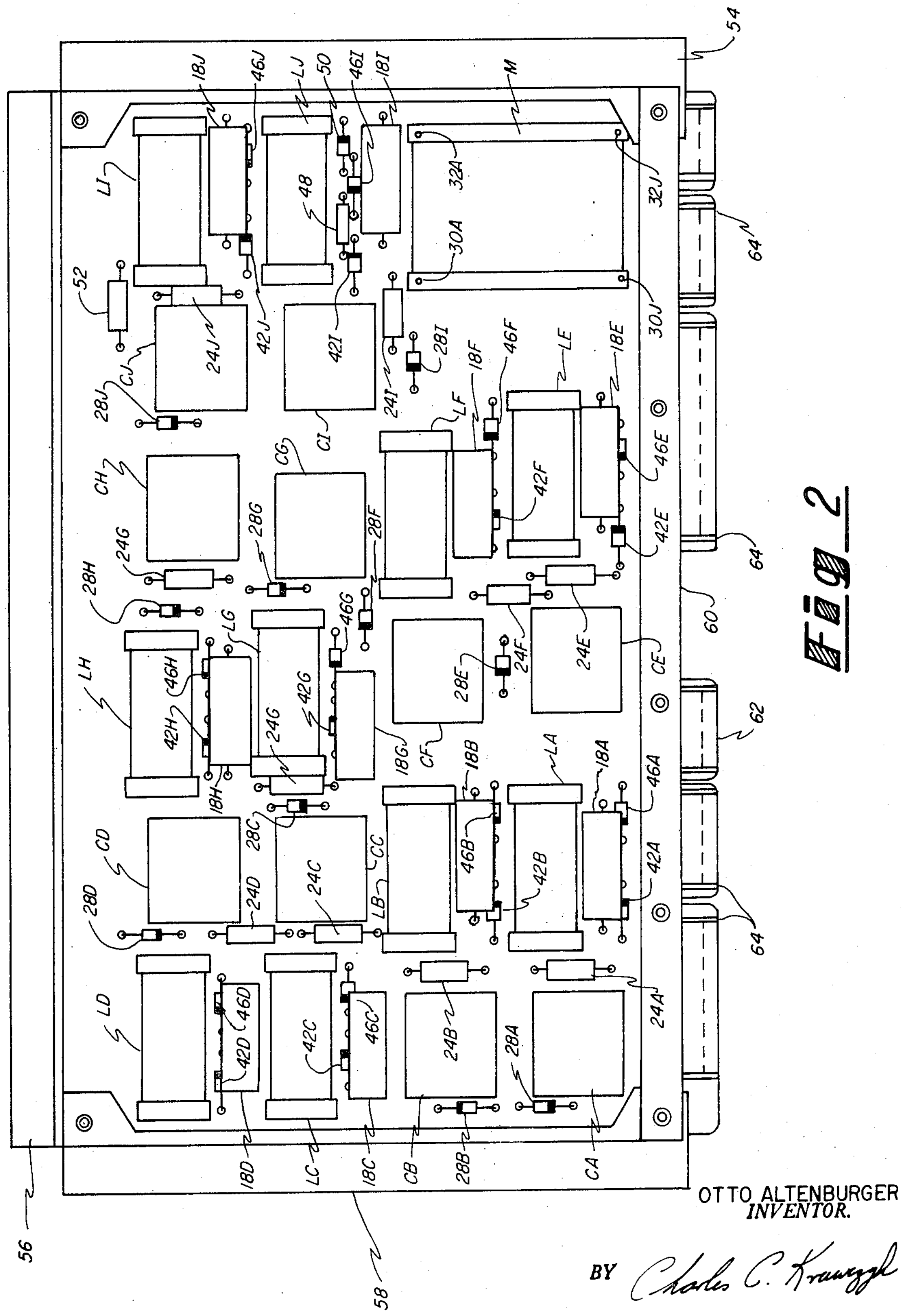
FIG. 2 is a plane view of a printed wiring board assembly of the line circuit arrangement of the invention.

FIG. 2 is a planar view of the plug-in type board assembly of the line circuit arrangement. The board itself has supporting members 54–60 on each side to provide it with rigidity. The support structure is completely explained in a U.S. Pat. No. 3,566,193, entitled "Printed Circuit Card Arrangement With Support Frame and Support Assembly." Along one edge 62 are provided contacts 64 for electrical connection with the connector contacts when the board is inserted into a connector. The reference numerals used in FIG. 1 are used to identify the same components in FIG. 2.

Since the circuits are provided on plug-in type boards, a user need only purchase that number of boards required to give him the capacity he initially desires. As the number of telephone lines in his system increases he can easily expand his capacity to match the growth by adding a corresponding number of line circuit boards. No internal rewiring of the system is required nor must the scanning equipment be changed. The printed circuit board need merely be added by insertion into the proper connector.

The line circuit arrangement of the invention used in conjunction with the line scanner-marker circuit provides a fast and efficient means for monitoring telephone service requests in originating calls and making idle/busy checks in terminating calls. The line scanner-marker can now monitor the line circuits in groups of ten (corresponding to a single line circuit board) rather than individually scanning each line circuit. When an originating call or a terminating call is detected within a group, the line scanner-marker can then scan within the group to locate and identify the specific line circuit for which the condition is exhibited. Only one circuit board is seized or selected at one time. Hence, common scanning and monitoring signals can be applied to all boards but only the line circuit on the seized or selected board will respond.

Since the scanner need not examine every line circuit initially in search of the above conditions, the scanning process can be significantly speeded up. Once a circuit board is seized or selected, only the individual line circuits on that board need be scanned. When more line circuit capacity is added, the line scanner merely monitors more circuit boards and the same signals for scanning lines and marking lines are applied to the added boards. Since the circuit boards are scanned at a rapid rate, the line scanner-marker circuit can be designed with a large number of extra scan positions for accommodating future line circuit additions without materially affecting the time required for line scanning.

What is claimed is:

1. A line circuit arrangement for a telephone system including a plurality of line circuits mounted on a plug-in type board comprising:

eight individual terminals for each line circuit;

first and second common terminals;

a pair of power terminals;

a cut-off relay in each line circuit connected between the first of said individual terminals of the respective line circuit and one of said power terminals;

a line relay in each of the line circuits connected between at least one of said power terminals and at least one of the second and third individual terminals of the respective line circuits through normally closed contacts of said cut-off relay;

normally open contacts of said cut-off relay in each of said line circuits interconnecting the second individual terminal to the fourth individual terminal and the third individual terminal to the fifth individual terminal of the respective line circuits;

a mark relay circuit means connected between the first common terminal and one of said power terminals;

circuit means connecting the sixth individual terminal of each of said line circuits to the seventh individual terminal of the respective line circuit through separate normally open contacts of said mark relay circuit means;

first circuit means connecting said first common terminal to the eighth individual terminal of each of the line circuits through normally closed contacts of the cut-off relay of the respective line circuits, and second circuit means for connecting the second common terminal to said first circuit means through normally open contacts of the line relay of the respective line circuit.

2. A line circuit arrangement as defined in claim 1 wherein said mark relay circuit means includes a single coil relay.

3. A line circuit arrangement as defined in claim 1 wherein said line relay is a dual coil relay having one coil connected between one power supply terminal and the second individual terminal and the other coil connected between the other power supply terminal and the third individual terminal.

4. A line circuit arrangement as defined in claim 1 wherein said first circuit means connecting said first common terminal to the eighth individual terminal and said second circuit means connecting the second common terminal to the eight individual terminal each includes a diode.

5. A line circuit arrangement as defined in claim 1 wherein all said terminals are located along one edge of said plug-in type board for insertion into a connector means.

6. A line circuit arrangement as defined in claim 1 wherein said first individual terminal is for a sleeve lead, said second and fourth individual terminals and said third and fifth individual terminals are for tip and ring leads and said sixth and seventh individual terminals are for mark leads.

* * * * *